May 12, 1964  F. CASELLA  3,132,555
ANCHORING DEVICE COMPRISING RADIALLY EXPANSIBLE
ARMS SLIDABLE WITHIN AN OPEN SHELL
Filed Sept. 11, 1961
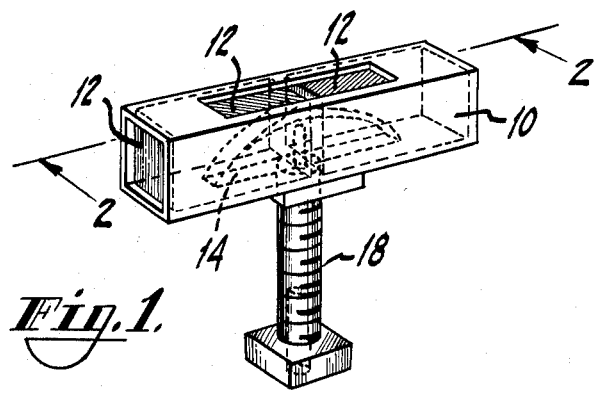
Fig. 1.
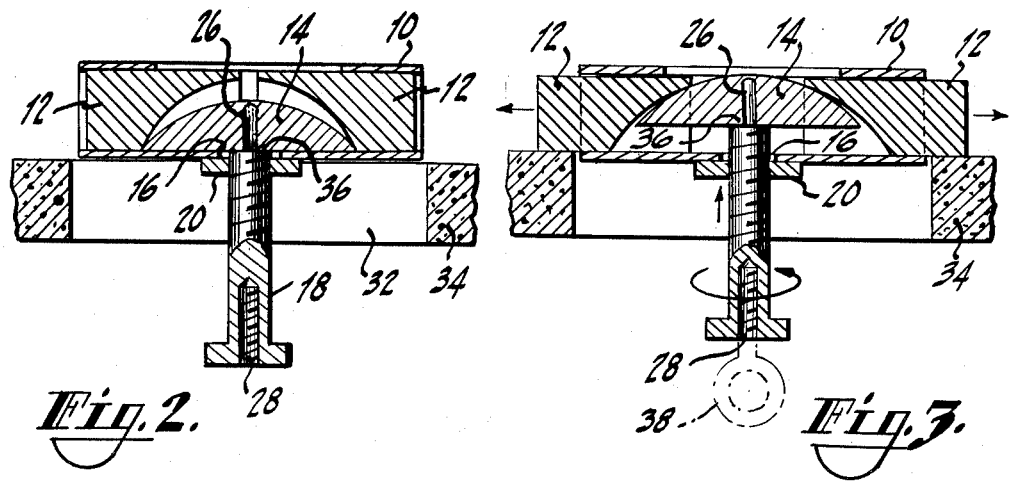
Fig. 2.    Fig. 3.
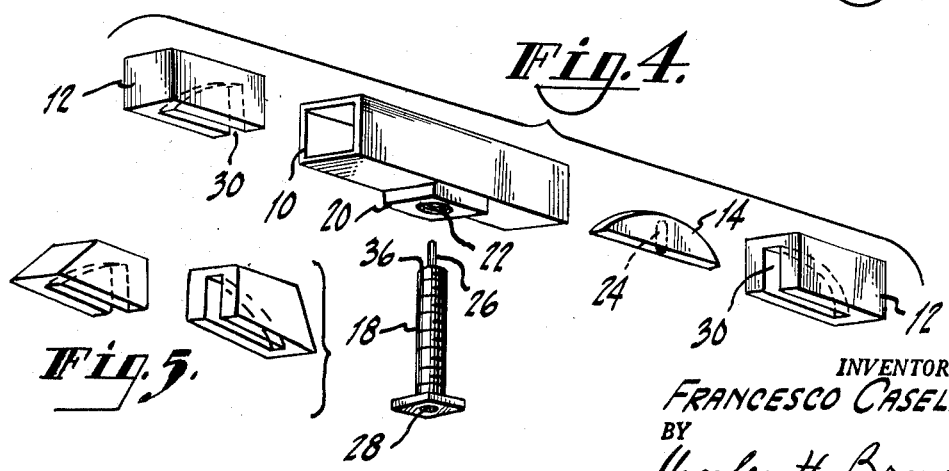
Fig. 4.
Fig. 5.
INVENTOR.
FRANCESCO CASELLA
BY
Charles H. Brown
ATTORNEY

United States Patent Office 3,132,555
Patented May 12, 1964

3,132,555
ANCHORING DEVICE COMPRISING RADIALLY EXPANSIBLE ARMS SLIDABLE WITHIN AN OPEN SHELL
Francesco Casella, 3044 Albany Crescent, Bronx, N.Y.
Filed Sept. 11, 1961, Ser. No. 137,416
3 Claims. (Cl. 85—2.4)

This invention comprises an expansion anchoring device for suspending an object from a horizontal surface, such as a ceiling. The object to be suspended from the anchoring device may be a lighting fixture or anything to be lifted and held in an elevated position while work is to be performed thereon.

A detailed description of the invention follows, in conjunction with a drawing, wherein:

FIG. 1 is a perspective view of the expansible ceiling anchoring device of the invention in its unexpanded state;

FIG. 2 is a longitudinal section through the anchoring device of FIG. 1 taken along line 2—2, as the device appears when it is first introduced into the hole prepared for its reception in the concrete, masonry or wooden ceiling;

FIG. 3 is a view similar to that of FIG. 2 and shows the anchoring device of the invention in its expanded state;

FIG. 4 is an exploded view of the anchoring device showing the details of the component parts thereof; and FIG. 5 shows an alternative form for the expansible arms of the anchoring device of the invention.

The anchoring device of the invention comprises a relatively thin-walled, hollow, rectangular-shaped, elongated metallic sleeve or shell 10 which is open at both ends and contains therein a pair of grooved metallic expansible members or arms 12, 12 positioned on opposite sides of a generally elliptically shaped or contoured wedge 14. The bottom wall of shell 10 has a centrally positioned opening 16 for the reception of the shank of a machine screw or bolt 18. A thick metallic portion 20 is secured to the bottom wall of the shell 10 and surrounds the opening 16. Portion 20 is provided with a threaded opening 22 which registers with the opening 16 and is internally threaded to engage and cooperate with the threads on the shank of the screw 18. By way of example, thickened portion 20 may be a nut which is soldered, brazed or welded to the shell 10.

Wedge 14 has an arcuate-shaped upper surface, elliptical for example, and is provided with an internal central smooth bore 24 extending over substantially the entire height of the wedge for enabling a metallic pin 26 on the top of the shank of screw or bolt 18 to easily enter therein for its full length. This pin can be milled out of a larger metallic portion of screw 18 or merely be an appendage securely fastened to the top of the screw as by soldering, brazing or welding. The diameter of the shank of the screw 18 is larger than the diameter of the bore 24 in the wedge 14. The lower part of screw 18 may be internally threaded at 28 to enable a fixture or a hook 38 to be removably attached thereto as shown for example in FIG. 3.

The expansible members or arms are easily slidable within the sleeve or shell 10 and each comprises a metallic block having an arcuate-shaped groove 30 therein facing the wedge 14 for accommodating the adjoining arcuate surface of the wedge.

The anchoring device of the invention is adapted to be inserted in its compact or unexpanded state into a hole 32 in the ceiling 34, as shown in FIG. 2, and this hole need only have a length and width very slightly larger than the length and width, respectively, of the shell 10. After insertion of the device into the hole such that the shell is positioned above upper surface of the concrete, masonry or wooden ceiling, the device may be turned so that the length of shell 10 extends across the width or narrow dimension of the rectangular-shaped hole, to thereby rest on the ceiling, if desired, or remain in the position in which it enters the ceiling, as shown in FIG. 3, prior to the rotation of screw 28 which results in the outward movement of the arms 12 from the shell.

In the initial or unexpanded position of the anchoring device, as shown in FIGS. 1 and 2, the arms are fully retracted within the shell 10, and the bottom of the wedge rests on the shoulder 36 provided by the top portion of the shank. In this state, the arcuate-shaped surface of the wedge 14 rests within the arcuate grooves of the arms 12, 12, and the pin 26 is inside the bore 24 of the wedge. Rotation of the screw or bolt 18, for example in the direction shown in FIG. 3, causes the shank of the screw to raise the wedge 14. As the wedge rises on top of the shoulder 36, in response to the rotation of the screw, its arcuate-shaped surface pushes against the arms 12, 12 within the respective grooves thereof, and forces the arms to move out from opposite ends of the shell 10, as shown in FIG. 3. In this extended or expanded position, the arms 12, 12 of the anchoring device rest upon the upper surface of the ceiling and provide a support for any object which may then be suspended from screw 18, as for example from hook 38.

If desired, the end walls of the two expansible members or arms 12 which are farthest from the wedge 14 may be tapered and sloped to assume the shape shown in FIG. 5.

In one embodiment of the invention which was constructed and satisfactorily employed, the rectangular-shaped shell 10 was approximately 2 3/16" long, 7/16" wide and 11/16" high, the wedge had a length of 1 2/8" and a height of 7/16", the expansible arms had a length of 1 1/16", and a height slightly less than the internal height dimension of the shell, and the screw had an overall length of approximately 2 3/16". It will thus be noted that the expansible arms fitted snugly but easily within the end portions of the shell. The shell was made of thin gauge steel and the wedge and arms 12 made of aluminum. This device in its expanded state was able to support the weight of a 150 lb. man. It is apparent that the foregoing dimensions may vary as desired and that the shape of the shell and the expansible arms may deviate from the rectangular-shaped configuration shown, for example they may be round, without departing from the spirit and scope of the invention. The slot-like cut-out portion in the upper wall of the shell 10, as shown in the drawings, was provided to enable external inspection of the wedge and arms, but may be omitted.

What is claimed is:

1. An expansion anchoring device comprising a hollow shell open at both ends, a pair of arms snugly slidable within the end portions of said shell, a wedge having a straight bottom portion and an arcuate-shaped upper portion located between said arms and adapted to be centrally located in said shell, each of said arms having an arcuate-shaped groove in the portion thereof nearest said wedge and into which the adjacent arcuate-shaped portion of said wedge rests when said device is in the unexpanded state, said wedge having a bore in the center thereof extending vertically from the bottom thereof, said shell having a threaded hole in the bottom thereof registering with the bore in said wedge, and a screw entering said hole in the bottom of said shell and having a shank provided with threads which cooperate with the threads in said hole, the top of said shank having a pin which is adapted to enter the bore in said wedge whereby rotation of said screw in one direction exerts vertical pressure against said wedge to cause it to force said arms outwards from the open ends of said shell in opposite directions.

2. An anchoring device in accordance with claim 1, wherein said pin on the screw and the bore in said wedge have diameters which are shorter than the diameter of the shank of said screw, the top of said shank at the bottom of said pin constituting a shoulder on which the bottom of said wedge is adapted to rest.

3. An expansion anchoring device for suspending an object from a ceiling, comprising a hollow thin-walled and rectangular-shaped metallic shell open at both ends, a pair of metallic expansible arms slidable within the open end portions of said shell, an arcuate-shaped metallic wedge between said expansible arms and centrally located in said shell, each of said expansible arms being a rectangular-shaped block and having an arcuate-shaped groove into which the adjacent portion of said wedge rests when said arms and wedge are in the unexpanded state of said anchoring device, the arcuate grooves extending from the upper part of said blocks nearest the wedge to the lower part nearest the bottom wall of said shell and in a direction toward an open end of said shell, and means externally of said shell and located under the bottom wall of said shell for exerting pressure against said wedge in an upward direction to raise the wedge and force the expansible arms out from the open ends of said shell in opposite directions.

References Cited in the file of this patent

UNITED STATES PATENTS

| | | |
|---|---|---|
| 2,377,086 | Lang | May 29, 1945 |
| 3,014,399 | Schaffner | Dec. 26, 1961 |

FOREIGN PATENTS

| | | |
|---|---|---|
| 634,926 | Great Britain | Mar. 29, 1950 |
| 853,514 | Germany | Oct. 27, 1952 |
| 326,441 | Switzerland | Feb. 15, 1958 |